(12) United States Patent
Poulat et al.

(10) Patent No.: US 11,028,221 B2
(45) Date of Patent: Jun. 8, 2021

(54) PET POLYMER WITH AN ANTI-CRYSTALLIZATION COMONOMER THAT CAN BE BIO-SOURCED

(71) Applicant: SOCIETE ANONYME DES EAUX MINERALES D'EVIAN ET EN ABRÉGÉ "S.A.E.M.E", Evian-les-Bains (FR)

(72) Inventors: Françoise Poulat, Sciez (FR); Philippe Reutenauer, Thonon les Bains (FR)

(73) Assignee: SOCIETE ANONYME DES EAUX MINERALES D'EVIAN ET EN ABRÉGÉ "S.A.E.M.E", Evian-les-Bains (FR)

( * ) Notice: Subject to any disclaimer, the term of this patent is extended or adjusted under 35 U.S.C. 154(b) by 0 days.

(21) Appl. No.: 16/060,525

(22) PCT Filed: Dec. 11, 2015

(86) PCT No.: PCT/IB2015/002444
§ 371 (c)(1),
(2) Date: Jun. 8, 2018

(87) PCT Pub. No.: WO2017/098296
PCT Pub. Date: Jun. 15, 2017

(65) Prior Publication Data
US 2018/0355100 A1    Dec. 13, 2018

(51) Int. Cl.
| C08G 63/183 | (2006.01) |
| C08G 63/181 | (2006.01) |
| C08G 63/78  | (2006.01) |
| C08G 63/42  | (2006.01) |
| C08G 63/80  | (2006.01) |

(52) U.S. Cl.
CPC ......... *C08G 63/183* (2013.01); *C08G 63/181* (2013.01); *C08G 63/42* (2013.01); *C08G 63/78* (2013.01); *C08G 63/80* (2013.01); *C08G 2390/00* (2013.01)

(58) Field of Classification Search
CPC .............. C08G 2390/00; C08G 63/181; C08G 63/183; C08G 63/42; C08G 63/78; C08G 63/80
See application file for complete search history.

(56) References Cited

U.S. PATENT DOCUMENTS

| 4,263,354 | A  | 4/1981  | Westermann        |
| 5,616,496 | A  | 4/1997  | Frost et al.      |
| 6,063,465 | A  | 5/2000  | Charbonneau et al.|
| 6,113,997 | A  | 9/2000  | Massey et al.     |
| 7,238,770 | B2 | 7/2007  | Edwards et al.    |
| 8,946,472 | B2 | 2/2015  | Berti et al.      |
| 9,353,237 | B2 | 5/2016  | Morgan            |
| 9,778,243 | B2 | 10/2017 | Kriegel et al.    |

| 2004/0091651 | A1 | 5/2004  | Rule et al.      |
| 2004/0236065 | A1 | 11/2004 | Denis et al.     |
| 2008/0216391 | A1 | 9/2008  | Cortright et al. |
| 2009/0124829 | A1 | 5/2009  | Gong             |
| 2009/0198022 | A1 | 8/2009  | Nichols et al.   |
| 2009/0246430 | A1 | 10/2009 | Kriegel et al.   |
| 2010/0028512 | A1 | 2/2010  | Kriegel et al.   |
| 2010/0168371 | A1 | 7/2010  | Berti et al.     |
| 2010/0168373 | A1 | 7/2010  | Berti et al.     |
| 2010/0168461 | A1 | 7/2010  | Berti et al.     |
| 2010/0314243 | A1 | 12/2010 | Frost et al.     |
| 2011/0262669 | A1 | 10/2011 | Kriegel et al.   |
| 2012/0322159 | A1 | 12/2012 | Kriegel et al.   |
| 2014/0163195 | A1 | 6/2014  | Berti et al.     |
| 2016/0271838 | A1 | 9/2016  | Morgan           |
| 2017/0002136 | A1 | 1/2017  | Sookraj          |

(Continued)

FOREIGN PATENT DOCUMENTS

| CN | 102190782 B | 8/2015  |
| EP | 0041035 A1  | 12/1981 |
| EP | 0465040 A1  | 1/1992  |

(Continued)

OTHER PUBLICATIONS

Min et al "From Fossil Resources to Renewable Resources: Synthesis, Structure, Properties and Comparison of Terephthalic Acid-2,5-Furandicarboxylic Acid-Diol Copolyesters", Jun. 2015 (Year: 2015).*
Steven K. Burgess et al "Chain Mobility, Thermal, and Mechanical Properties of Poly(ethylene furanoate) Compared to Poly(ethylene terephthalate)", Macromolecules, Feb. 3, 2014 (Year: 2014).*
F.M. Medvedeva et al"Mixed polyesters of ethylene glycol with 295-fu randicarboxylic and terephthalic acids",Soviet Plastics 1963 (Year: 1963).*

(Continued)

*Primary Examiner* — Ling Siu Choi
*Assistant Examiner* — Gennadiy Mesh
(74) *Attorney, Agent, or Firm* — Birch, Stewart, Kolasch & Birch, LLP

(57) ABSTRACT

A polyethylene terephthalate (PET) polymer having diacid units derived from diacid compounds, said diacid units comprising: a) from 92.50 mol % to 97.75 mol % of terephthalic units derived from terephthalic acid (TA) or an ester thereof, and b) from 2.25 mol % to 7.50 mol % of 2,5-FDCA units derived from 2,5- furandicarboxylic acid (2,5-FDCA) or an ester thereof, and-diol units derived from diol compound(s), the diol units having monoethylene glycol units derived from monoethylene glycol (MEG), as well as to a method to prepare a PET polymer. The use of a 2,5-FDCA compound selected from 2,5- furandicarboxylic acid (2,5-FDCA) and esters thereof as an anti-crystallization comonomer in a PET polymer and a bio-based PET polymer in which the anti-crystallisation comonomer is bio-based.

4 Claims, No Drawings

(56) References Cited

U.S. PATENT DOCUMENTS

2018/0037696 A1    2/2018    Mehta

FOREIGN PATENT DOCUMENTS

| | | | |
|---|---|---|---|
| JP | 2008-291244 | * | 12/2008 |
| KR | 20140088972 | * | 6/2014 |
| KR | 20150076049 | * | 6/2015 |
| KR | 10-2015-0076049 A | | 7/2015 |
| WO | WO 2007/001536 A1 | | 1/2007 |
| WO | WO 2007/104514 A2 | | 9/2007 |
| WO | WO 2007/104515 A1 | | 9/2007 |
| WO | WO 2009/030508 A2 | | 3/2009 |
| WO | WO 2009/030510 A2 | | 3/2009 |
| WO | WO 2009/030511 A1 | | 3/2009 |
| WO | WO 2009/030512 A2 | | 3/2009 |
| WO | WO 2009/120457 A2 | | 10/2009 |
| WO | WO 2010/028206 A1 | | 3/2010 |
| WO | WO 2010/078328 A2 | | 7/2010 |
| WO | WO 2010/101698 A2 | | 9/2010 |
| WO | WO 2011/017560 A1 | | 2/2011 |
| WO | WO 2011/026913 A1 | | 3/2011 |
| WO | WO 2011/043660 A2 | | 4/2011 |
| WO | WO 2011/043661 A1 | | 4/2011 |
| WO | WO 2011/044243 A1 | | 4/2011 |
| WO | WO 2011/085223 A1 | | 7/2011 |
| WO | WO 2012/170520 A1 | | 12/2012 |
| WO | WO 2012/174104 A1 | | 12/2012 |
| WO | WO 2013/034743 A1 | | 3/2013 |
| WO | WO 2013/034950 A1 | | 3/2013 |
| WO | WO 2013/040514 A1 | | 3/2013 |
| WO | WO 2013/100768 A2 | | 7/2013 |
| WO | WO 2013/103574 A1 | | 7/2013 |
| WO | WO 2014/043468 A1 | | 3/2014 |
| WO | WO 2014/066746 A1 | | 5/2014 |
| WO | WO 2014/110415 A1 | | 7/2014 |
| WO | WO 2014/151100 A1 | | 9/2014 |
| WO | WO 2014/159738 A2 | | 10/2014 |
| WO | WO 2014/159741 A1 | | 10/2014 |
| WO | WO 2014/163500 A1 | | 10/2014 |
| WO | WO 2015/023918 A2 | | 2/2015 |
| WO | WO 2015/030590 A1 | | 3/2015 |
| WO | WO 2015/042407 A1 | | 3/2015 |
| WO | WO 2016/140901 A1 | | 9/2016 |
| WO | WO 2017/004455 A1 | | 1/2017 |

OTHER PUBLICATIONS

International Search Report (PCT/ISA/210) issued in PCT/IB2015/002444, dated Jul. 29, 2016.

Written Opinion (PCT/ISA/237) issued in PCT/IB2015/002444, dated Jul. 29, 2016.

* cited by examiner

PET POLYMER WITH AN ANTI-CRYSTALLIZATION COMONOMER THAT CAN BE BIO-SOURCED

FIELD OF THE INVENTION

The invention relates to a PET polymer which comprises an anti-crystallization comonomer that can be bio-sourced, and more particularly 2,5-furandicarboxylic acid or an ester thereof, and thus to a PET polymer which is completely bio-sourced. The invention also relates to a method for producing such PET polymers.

BACKGROUND

For several tens of years, polyester, in particular polyethylene terephthalate (PET), has been increasingly used in the production of hollow containers, in particular bottles.

Commercial PET (called hereafter oil-PET) is generally produced with diacid and diol monomers synthesized with petrochennically-derived raw material (raw materials obtained from petrochemistry). Because of decline of world oil reserve and increasing oil prices and/or because of the need to improve the carbon footprint of materials, many researches have been made for completely or partially replacing petrochennically-derived raw material by raw material coming from biologically based materials (bio-materials).

A polyester made from bio-materials has already been proposed. This polyester is polylactic polyester (PLA) and is made with lactic acid as acid monomer. Lactic acid is produced from bio-materials like rice, corn, sugars, etc.

However, PLA cannot replace PET in all applications due to the different properties of PLA and PET. For example, PLA cannot be used to produce containers for carbonated beverages due to the lower gas barrier property of PLA.

Consequently, investigations have been done for providing a method for producing PET from monomers obtained at least partially from bio-materials, hereafter called bio-PET.

WO 2009/120457 provides a bio-PET. This bio-PET comprises 25 to 75 wt % of terephthalate compound selected from terephthalic acid, dimethyl terephthalate, isophthalic acid, and a combination thereof. It also comprises 20 to 50 wt % of diol compound selected from ethylene glycol, cyclohexane dimethanol, and a combination thereof. At least 1 wt % of the terephthalate compound and/or the diol compound is obtained from bio-materials. The bio-PET of WO 2009/120457 can be used for manufacturing beverage containers.

WO 2013/034743 discloses a method to prepare a bio-PET from a bio-based terephthalate compound and/or a bio-based monoethylne glycol using a crystallization retarding compound, such as isophtalic acid or 1,4-cyclohexanedimethanol.

However, none of these documents discloses a bio-PET made completely from bio-sourced starting materials, in particular in which even the crystallization retarding compound (also called anti-crystallization comonomer) is obtained from bio-materials.

Now, the anti-crystallization comonomers commonly used in the art are difficult to be prepared from biomaterials. There exists thus a need for new anti-crystallization comonomers which can be easily prepared from bio-materials and which can be used in the preparation of PET polymer without significantly modifying other properties.

The inventors have surprisingly discovered that it is possible to use 2,5-furandicarboxylic acid (2,5-FDCA) or an ester thereof, which can be easily prepared from bio-materials, as anti-crystallization comonomer in the preparation of PET polymer, allowing the access to a completely bio-sourced PET polymer, in addition to the fact that 2,5-FDCA improves the polycondensation kinetics during the preparation of the PET polymer.

Document WO 2013/103574 discloses polymers of 2,5-furandicarboxylic acid, terephthalic acid and monoethylene glycol. However, 2,5-FDCA is used in a high amount and is thus not used as an anti-crystallization comonomer as in the present invention.

SUMMARY

The invention has thus for a subject-matter a polyethylene terephthalate (PET) polymer comprising:
diacid units derived from diacid compounds, said diacid units comprising:
  a) from 92.50 mol % to 97.75 mol % of terephthalic units derived from terephthalic acid (TA) or an ester thereof, and
  b) from 2.25 mol % to 7.50 mol % of 2,5-FDCA units derived from 2,5-furandicarboxylic acid (2,5-FDCA) or an ester thereof, and
diol units derived from diol compound(s), said diol units comprising monoethylene glycol units derived from monoethylene glycol (MEG),
as well as a method to prepare such a polymer comprising a copolymerization of a mixture of:
the diacid compounds comprising terephthalic acid (TA) or an ester thereof, and 2,5-furandicarboxylic acid (2,5-FDCA) or an ester thereof, and
the diol compound(s) comprising monoethylene glycol.

The invention concerns the use of 2,5-furandicarboxylic acid (2,5-FDCA) or an ester thereof as an anti-crystallization comonomer in a PET polymer.

The invention relates also to a fully bio-based PET, i.e. a bio-based PET polymer comprising:
bio-based terephthalic units,
bio-based monoethylene glycol units, and
from 0.50 mol % to 7.50 mol %, advantageously from 2.25 mol % to 7.50 mol %, preferably from 2.50 mol % to 5.00 mol %, of anti-crystallization units based on the total amount of the diol units of the bio-based PET polymer if the anti-crystallization units correspond to diol units or based on the total amount of the diacid units of the bio-based PET polymer if the anti-crystallization units correspond to diacid units,
wherein the anti-crystallization units are derived from bio-based anti-crystallization comonomers.

DETAILED DESCRIPTION

Definitions

For the sake of the description and the claims, the following definitions are to be considered.

In the present application "bio-materials" refer to biologically based materials, typically obtained from plants. Such materials are also referred to "bio-sourced materials" or "bio-based materials" or "renewable materials".

"Bio-PET" means a PET polymer produced at least partly from monomers coming from bio-materials. One can also refer to "bio-based PET" or "bio-sourced PET" or "PET from renewable resource" or "renewable PET" or "PET from vegetal origin".

In the present application, "compound(s)" refer(s) to monomer(s) used to prepare the PET polymer. The compounds are engaged in a polymerization reaction to provide a polymer presenting corresponding "units". Thus the PET polymer according to the present invention will typically contain:

"diacid units" derived from "diacid compounds", for example terephtalic units and 2,5-FDCA units derived respectively from terephtalic acid or an ester thereof and 2,5-FDCA or an ester thereof, and "diol units" derived from "diol compound(s)", for example monoethylene glycol units derived from monoethylene glycol.

PET Polymer

A PET polymer has typically the general formula:

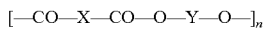

wherein:
X is a group of the diacid unit (—CO—X—CO—), for example

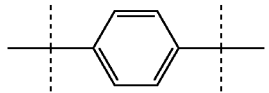

for a terephthalic unit or

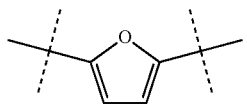

for a 2,5-FDCA unit,
Y is a group of the diol unit (—O—Y—O—), for example —$CH_2CH_2$— for a monoethylene glycol unit or —$CH_2CH_2$—O—$CH_2CH_2$— for a diethylene glycol unit, and n is a degree of polymerisation.

Herein the following conventions are used for calculations of amounts in the polymer:
the formula of a diacid unit is —CO—X—CO—, for example —CO—$C_6H_4$—CO— for a terephthalic unit,
the formula of a diol unit is —O—Y—O—, for example —O—$CH_2CH_2$—O— for a monoethylene glycol unit.

For sake of simplicity, one sometimes refers to monomers for units.

Typically the molar ratio in the PET polymer between diacid units and diol units is 0.9 to 1.1. Typically the weight ratio in the PET polymer between diacid units and diol units is from 1.98 to 2.42. The one skilled in the art knows the relevant amounts of diacid and diol compounds to be provided, and the appropriate process conditions, to obtain such a molar or weight ratio in the PET polymer.

Diacid Units

The diacid units are derived from diacid compounds comprising at least a terephthalic compound and a 2,5-FDCA compound.

This terephthalic compound is terephthalic acid or an ester thereof.

By "ester of terephthalic acid" is meant herein a mono- or di-ester, and more particularly a diester, of terephthalic acid with a ($C_1$-$C_6$)alkanol, i.e. an alcohol of formula R—OH with R representing a linear or branched saturated hydrocarbon chain comprising 1 to 6 carbon atoms (($C_1$-$C_6$)alkyl), such as methyl. It will be more particularly dimethyl terephthalate.

The terephthalic compound is thus more particularly terephthalic acid or dimethyl terephthalate. Terephthalic acid, for example terephthalic acid marketed as "Pure Terephthalic Acid", is usually preferred.

In one embodiment, all or at least a part of the terephthalic compound is obtained from a bio-material. The bio-material, from which the terephthalic compound is obtained, comprises for example terpene, terpenoid or a mixture thereof; para-xylene; or muconic acid.

Some appropriate methods for producing terephthalic compounds such as terephthalic acid (TA) or dimethyl terephthalate (DMT) from bio-materials are described below.

A method for producing terephthalic acid from bio-materials consists in providing bio-materials comprising terpene, terpenoid or a mixture thereof. Terpene, terpenoid or a mixture thereof are extracted from the bio-materials and then converted to para-cymene. Para-cymene is then converted to terephthalic acid by oxidation as disclosed in US 2010/0168461. An example of terpene-containing bio-materials is, for example, lemon.

Another method of producing terephthalic acid from bio-materials comprises converting para-xylene obtained from bio-materials to terephthalic acid, preferably pure terephthalic acid. Examples of para-xylene obtained from bio-materials include Virent's BioForm PX™. It can be obtained by a catalytic process that converts plant-based sugars into para-xylene. The sugars can come from a wide variety of feedstock including sugar cane, corn and woody biomass. Appropriate catalytic processes are for examples described in documents US 2008/0216391 and WO 2010/028206. Such processes allow producing an aromatic-rich stream that can be reformatted to generate para-xylene. Such processes typically comprises a step of aqueous phase reforming (APR) by reacting sugars with $H_2$ and a de-oxygenation catalyst to provide an oxygenate, and a step of condensation of the oxygenate in the presence of an acidic catalyst, to obtain a mixture comprises para-xylene. This mixture can be purified or reformatted to para-xylene.

Another method for producing terephthalic acid and/or dimethyl terephthalate include converting bio-materials into Chloromethylfurfural (CMF), converting CMF into 2,5-Dimethylfuran (DMF), converting DMF to para-xylene, and then converting para-xylene to terephthalic acid and/or dimethyl terephthalate. Appropriate processes are described in documents WO2013040514, WO2012170520, WO2014043468, WO2014066746, WO2015023918, WO2014159741, WO2014159738, WO2014151100, WO2015042407.

Another method for producing terephthalic acid and/or dimethyl terephthalate from bio-materials comprises producing a muconic acid from a biomass by a microbiological process involving micro-organisms, and then converting the muconic acid into terephthalic acid and/or dimethyl terephthalate. Such a method is described in document US 2010/0314243. Typically, the muconic acid is cis,cis-muconic acid. Appropriate microbiological processes are for example described in documents U.S. Pat. No. 5,616,496 and WO 2011/017560. Muconic acid, preferably in the form of trans,trans-muconic acid, optionally after a chemical transformation step from a cis,cis form to a trans,trans form, can then be transformed into terephthalic acid and/or dimethyl terephthalate by chemical reactions involving a dienophile compound such as ethylene or acetylene. Such reactions are described in documents US 2010/0314243 and WO 2011/017560 and references cited in such documents. It is mentioned that the ethylene or acetylene compound are preferably obtained from bio-materials. These can be from bio-ethanol as mentioned below in the production of monoethylene glycol. Preferably the ethylene or acetylene derived from bio-material used to produce terephthalic acid and/or dimethyl terephthalate from bio-materials is an intermediate extracted from the production of monoethylene glycol from bio-materials. This provide a most economical and efficient use of streams of materials and intermediates.

Another method for producing terephthalic acid from bio-materials comprises producing isobutanol from biomass by fermentation, then converting isobutanol to isobutene, then converting isobutene to isooctene by oligomerization, then converting isooctene to xylenes such as para-xylene by dehydrocyclization, then converting para-xylene to terephthalic acid, as disclosed in documents WO 2011/044243 and WO 2011/085223.

Another method for producing terephthalic acid from bio-materials comprises producing 2,5-furandicarboxylic acid (2,5-FDCA) from a biomass and then converting to terephthalic acid. For example a biomass is converted to a sugar comprising fructose, sucrose or mixtures thereof, then the sugar is converted to 5-hydroxymethylfurfural, then 5-hydroxymethylfurfural is oxidized to 2,5-furandicarboxylic acid, then 2,5-furandicarboxylic acid is reacted with ethylene in the presence of a solvent to produce a bicyclic ether, then the bicyclic ether is dehydrated to terephthalic acid. Such a method is for example described in document US 2009/0124829. It is mentioned that the ethylene is preferably obtained from bio-materials. Preferably the ethylene obtained from bio-material used to produce the bicyclic ether is an intermediate extracted from the production of monoethylene glycol from bio-materials. This provide a most economical and efficient use of streams of materials and intermediates.

Another method for producing terephthalic acid from bio-materials comprises converting a glucose or fructose from a biomass to 5-hydroxymethylfurfural (HMF), then hydrogenating the HMF to 2,5-dimethylfuran (DMF), then reacting the DMF with ethylene under cycloaddition reaction conditions and in the presence of a catalyst to produce para-xylene, then oxidizing the para-xylene with oxygen to produce terephthalic acid. It is mentioned that the ethylene is preferably obtained from bio-materials. Preferably the ethylene obtained from bio-material used to produce the bicyclic ether is an intermediate extracted from the production of monoethylene glycol from bio-materials. This provide a most economical and efficient use of streams of materials and intermediates.

The 2,5-FDCA compound is 2,5-furandicarboxylic acid or an ester thereof.

By "ester of 2,5-furandicarboxylic acid" is meant herein a mono- or di-ester, and more particularly a diester, of 2,5-furandicarboxylic acid with a $(C_1-C_6)$alkanol, i.e. an alcohol of formula $R_1$—OH with $R_1$ representing a linear or branched saturated hydrocarbon chain comprising 1 to 6 carbon atoms ($(C_1-C_6)$alkyl), such as methyl. It will be more particularly dimethyl 2,5-furandicarboxylate.

The 2,5-FDCA compound is thus more particularly 2,5-furandicarboxylic acid or dimethyl 2,5-furandicarboxylate, preferably 2,5-furandicarboxylic acid.

In one embodiment, all or at least a part of the 2,5-FDCA compound is obtained from a bio-material. The bio-material, from which the 2,5-FDCA compound is obtained, comprises for example fructose, sucrose or a mixture thereof.

A method for producing 2,5-furandicarboxylic acid from bio-materials comprises for example the conversion of a biomass to a sugar comprising fructose, sucrose or mixtures thereof, then the sugar is converted to 5-hydroxymethylfurfural or MethoxyMethylFurfural, which is finally oxidized to give 2,5-furandicarboxylic acid. A bio-based ester of 2,5-FDCA can then be prepared from this bio-based 2,5-FDCA by methods well known to the one skilled in the art. Appropriate processes are described in documents WO2011043661, WO2011043660, WO2007104515, WO2007104514, WO2009030511, WO2009030508, WO2009030510, WO2009030512, WO2013100768, WO2014163500, WO2015030590.

Another method for producing 2,5-furandicarboxylic acid from bio-materials include converting an intermediate obtained from biomaterials to FDCA by microbiological methods, for example as described in document WO2011026913.

The diacid units comprise 92.50 to 97.75 mol %, preferably 95.00 to 97.50 mol % of terephthalic units.

The diacid units comprise 2.25 to 7.50 mol %, preferably 2.50 to 5.00 mol % of 2,5-FDCA units.

Diol Units

The diol units are derived from diol compound(s) comprising monoethylene glycol (MEG). This monomer compound (MEG) provides mainly monoethylene glycol units (—O—$CH_2CH_2$—O—). Diethylene glycol units (—O—$CH_2CH_2$—O—$CH_2CH_2$—O—) are also often inherently present in PET since they are formed during synthesis by condensation of two molecules of monoethylene glycol. Depending on the concentration of diethylene glycol units desired in the final polyester, diethylene glycol can also be added as diol compound or some synthesis conditions can be controlled in order to limit diethylene glycol formation.

In a preferred embodiment, all or at least a part of the monoethylene glycol is obtained from a bio-material. Such a bio-material can be obtained from ethanol (bio-ethanol) produced from renewable bio-materials.

Bio-ethanol can be transformed into different chemical derivatives via classical chemical methods. Bio-ethanol can be transformed into ethylene and then ethylene oxide. Ethylene oxide is further hydrated to obtain ethylene glycol.

The bio-materials from which monoethylene glycol can be obtained, can be produced from one of the following materials:
plants like beet, sugar cane, maize, wheat, citrus fruits, woody plants, etc.;
plant wastes like sawdust, wheat straw, wheat corns, natural fibres, cellulosics, lignocelluosics, hemicelluloses, etc.

Producing bio-ethanol from bio-materials can comprise the following steps:
extracting glucose from bio-materials;
fermenting glucose using yeasts added into a mixture of sugar and water; and
distilling bio-ethanol.

When bio-materials contain at least wheat or maize, enzymatic or acid hydrolysis of bio-materials can be carried out for transforming wheat starch or maize starch into glucose. This step is not necessary in the case of beet, sugar cane or citrus fruits because glucose can be directly extracted from these bio-materials.

Advantageously, the diol units comprise at least 95.00 mol %, with reference to all diol units, of monoethylene glycol units, preferably at least 96.00 mol %, preferably at least 97.00 mol %.

Advantageously, diol units comprise less than 5.00 mol %, with reference to all diol units, of diethylene glycol units, preferably less than 4.00 mol %, for example less than 3.00 mol %.

Bio-Based Diacid and Diol Compounds

According to a preferred embodiment, at least one of the diacid compounds and diol compound(s) is obtained from at least one bio-material.

Preferably at least 0.50 wt % of the units of the PET polymer (called thus bio-PET), compared to the total amount of units in the PET polymer, are derived from diacid compound(s) and/or diol compound(s) obtained from bio-materials. Preferably at least 0.5 mol % of the units of the PET polymer, compared to the total amount of units in the PET polymer, are derived from diacid compound(s) and/or diol compound(s) obtained from bio-materials. These amounts are preferably of at least 1% wt % or mol %, preferably of at least 5 wt % or mol %, preferably of at least 10 wt % or mol %, preferably of at least 15 wt % or mol %, preferably of at least 20 wt % or mol %. In some embodiment these amount can be of from 20 to 25 wt % or mol %, or of from 25 to 30 wt % or mol %, or of from 30 to 35 wt % or mol %, or of from 35 to 40 wt % or mol %, or of from 40 to 45 wt % or mol %, or of from 45 to 55 wt % or mol %, or of from 55 to 65 wt % or mol %, or of from 65 to 75 wt % or mol %, or of from 75 to 85 wt % or mol %, or of from 85 to 90 wt % or mol %, or of from 90 to 95 wt % or mol %, or of from 95 to 99 wt % or mol %, or of from 99 to 100 wt % or mol %.

According to an advantageous embodiment, all the units of the PET polymer are derived from diacid compound(s) and/or diol compound(s) obtained from bio-materials.

To determine the presence and the amount in the PET polymer of units derived from monomers obtained from bio-materials, a good method is measuring decay process of $^{14}C$ (carbon-14), in disintegrations per minute per gram carbon or dpm/gC, through liquid scintillation counting. Decay process of the units coming from bio-materials is at least about 0.1 dpm/gC. The molar content of bio-sourced carbon atoms (carbon obtained from a bio-material, with reference to the total carbon content) in the PET polymer as measured from $^{14}C$ contents, typically according to ASTM D6866-10, is preferably of at least 1%, preferably at least 10%, preferably at least 15%, for example from 15% to 20%, or from 20% to 25%, or from 25% to 30%, or from 30% to 40%, or from 40% to 50%, or from 50% to 60%, or from 60% to 70% or from 70% to 80%, or from 80% to 90%, or from 90% to 95%, or from 95% to 99% or from 99% to 100%.

The content of bio-material in the PET polymer is preferably of at least 1 wt %, preferably at least 10 wt %, preferably at least 15 wt %, for example from 15 to 20 wt %, or from 20 to 25 wt %, or from 25 to 30 wt %, or from 30 to 40 wt %, or from 40 to 50 wt %, or from 50 to 60 wt %, or from 60 to 70 wt %, or from 70 to 80 wt %, or from 80 to 90 wt %, or from 90 to 95 wt %, or from 95 to 99 wt % or from 99 to 100 wt %. The content of bio-material in the PET polymer can be considered according to various methods and calculations.

In one embodiment, the content of bio-material in the PET polymer is considered as the content of bio-sourced carbon, as described above.

In one embodiment, the content of bio-material in the PET polymer is considered as the content by weight of diacid and diol compounds used to prepare the PET polymer, obtained from bio-materials, compared to the total of amount of diacid and diol compounds used to prepare the PET polymer.

In one preferred embodiment, the content of bio-material in the PET polymer is the content by weight of units derived from compounds used to prepare the PET polymer obtained from a bio-material, compared to the total amount of units, using the set of calculation rules (1) (preferred) or the set of calculation rules (2) below.

Set of Calculation Rules (1)

formula of diacid unit —CO—X—CO—, for example —CO—$C_6H_4$—CO— (Mw 132.13 g/mol) for terephthalic unit,
formula of diol unit —O—Y—O, for example —O—$CH_2CH_2$—O— (Mw 60.05 g/mol) for monoethylene glycol unit.

Set of Calculation Rules (2)

formula of diacid unit —O—CO—X—CO—, for example —O—CH—$C_6H_4$—CO— (Mw 148.12 g/mol) for terephthalic unit,
formula of diol unit —Y—O—, for example —O—$CH_2$—$CH_2$— (Mw 48.05 g/mol) for monoethylene glycol unit.

Packaging Element

The PET polymer according to the present invention can be in the form of a packaging element. The packaging element can be for example a container such as a bottle or a cup. The packaging element can be a film. Advantageously, it will be a container, and preferably a bottle.

The bottles according to the invention are used for packaging any liquid product, in particular for packaging liquid commodity foods such as various natural, spring, carbonated or non-carbonated mineral waters and sweet carbonated or non-carbonated drinks generally known as soda. Thus the PET packaging element can be a bottle, filled with carbonated drinks, natural still water, mineral still water, natural sparkling water or mineral sparkling water.

Method to Prepare the PET Polymer

The PET polymer according to the invention can be prepared by copolymerizing a mixture of the diacid compounds and the diol compound(s) to obtain a bio-PET polymer comprising diacid units and diol units as defined previously.

The diacid compounds comprise a terephthalic compound and a 2,5-FDCA compound. The terephthalic compound can be selected from terephthalic acid and an ester thereof, advantageously is selected from terephthalic acid and dimethyl terephthalate, and preferably is terephthalic acid. The 2,5-FDCA compound can be selected from 2,5-furandicarboxylic acid and an ester thereof, advantageously is selected from 2,5-furandicarboxylic acid and dimethyl 2,5-furandicarboxylate, preferably is 2,5-furandicarboxylic acid. Preferably, the diacid compounds comprise terephthalic acid and 2,5-furandicarboxylic acid.

Advantageously, the diacid compounds comprise 93.00 to 97.00 mol %, preferably 94.00 to 96.00 mol % of a terephthalic compound and 3.00 to 7.00 mol %, preferably 4.00 to 6.00 mol % of a 2,5-FDCA compound.

The diol compound(s) comprise(s) monoethylene glycol and optionally diethylene glycol, preferably consist of monoethylene glycol.

The amounts of the diacid and diol compounds are adapted to obtain a PET polymer with the units amounts defined previously. The one skilled in the art knows the relevant amounts of diacid and diol compounds to be provided for obtaining these units amounts.

In one embodiment:
the diacid compounds comprise terephthalic acid and 2,5-furandicarboxylic acid, and
the diol compound(s) comprise(s) monoethylene glycol, preferably 100 mol % of monoethylene glycol.

A part or all of the diacid compounds and/or the diol compound(s) can be bio-based, notably as detailed previously.

Copolymerization can be implemented according to processes known by the one skilled in the art. Typically, copolymerization comprises the following steps:
Step 1) melt polymerization, and
Step 2) solid state polymerization.

The step 1) of melt polymerization can comprise two successive sub-steps.

A first sub-step is referred to as an esterification or transesterification step and a second sub-step as a polycondensation step.

According to the invention, the first sub-step can be implemented according to two different preparation routes.

A first preparation route uses dimethyl terephthalate. It involves a transesterification reaction. Molten dimethyl terephthalate (DMT) is added to a large excess of monoethylene glycol (MEG), MEG:DMT molar ratio being approximately 1.7:2.2. The transesterification reaction is carried out at atmospheric pressure or at higher pressure (up to 8 kPa) and at a temperature of 150° C. to 250° C. approximately. It requires a catalyst, for example manganese acetate. Methanol is yielded during the reaction and is removed by distillation. Monoethylene glycol present in excess is removed after the transesterification reaction. The catalyst, which also acts as a catalyst for the decomposition of the obtained PET polymer, is blocked using phosphorus-containing compounds after the reaction. The product resulting from the transesterification reaction is a mixture of bis(hydroxyethyl) terephthalate and oligomers.

A second preparation route is the "direct esterification" route. It involves an esterification reaction of terephthalic acid (TA) with monoethylene glycol (MEG). It is carried out at a temperature of 150° C. to 280° C. approximately, notably 200 to 280° C., such as 250 to 280° C. This step can be carried out at atmospheric pressure or at higher pressure (up to 1 MPa). One typically uses a slight excess for terephthalic acid. MEG:TA molar ratio is then typically of approximately 1:1.4. A slight excess of monoethylene glycol can also be used. In this case, MEG:TA molar ratio is approximately 1.25:1. The MEG:TA molar ratio can thus be comprised advantageously between 1.5:1 and 1:1.5, notably between 1.4:1 and 1:1.4, in particular between 1.25:1 and 1:1.4. The result of this reaction is a mixture of oligomers having acid and hydroxyethyl terminal functional groups.

The second sub-step of polycondensation is typically carried out in the presence of a catalytic system like antimony oxide, titanium oxide, or germanium oxide. The polycondensation medium (a mixture of bis(hydroxyethyl) terephthalate, or oligomers having acid and hydroxyethyl terminal functional groups) is heated under stirring at a temperature of 245° C. to 280° C., and at a pressure of 10 Pa to 200 Pa approximately.

The PET polymer thus obtained is then typically poured into a die in order to obtain laces. After cooling, these laces are cut up to produce PET granules. The PET granules can be dried before further processing.

The step 2) of solid state polymerization preferably is performed by heating the PET granules under vacuum, inert atmosphere or low oxidizing atmosphere, in order to obtain the degree of polymerization desired for the planned application.

The granules after can be used as starting material for feeding plants for spinning of yarns or fibres, or for conversion in a packaging element, for example for the extrusion of films, for the injection-blow moulding of hollow bodies, for the injection-moulding or thermoforming of articles having various forms.

It is mentioned that further various additives such as brighteners, dyes or other additives such as light or heat stabilisers, antioxidants or barrier agents may be added, either during the copolymerization stage, or after this step by compounding with the PET.

Method to Prepare the Packaging Element

The PET polymer according to the present invention can be converted into a PET packaging element, such as a container (for ex. a bottle or a cup) or a film, by methods well known to the one skilled in the art.

For example the packaging element can be a bottle and the conversion of the PET polymer into a bottle can be carried out by injection blow molding or injection stretch blow molding. For example the packaging element can be a cup and the conversion of the PET polymer into a cup can be carried out by thermoforming. For example the packaging element can be a film and the conversion of the PET polymer into a film can be carried out by extruding and stretching.

For making bottles one can implement an injection blow molding technology (including injection stretch blow molding technology). This step can then comprise the following sub-steps:
injecting the PET polymer into a preform mould to form a preform;
heating the preform at least above the glass transition point of the PET polymer;
blowing the preform into a mould, to obtain a PET bottle.

After the sub-step of injecting and prior to the sub-step of heating the preform, one typically implements a step of cooling the preform.

The sub-step of injecting can comprise, for example, melting the PET polymer in a single or double screw injection-moulding machine. This allows plasticization of the PET polymer. It typically further comprises feeding plasticized PET polymer under pressure of $2.5 \cdot 10^7$ Pa (250 bars) to $5 \cdot 10^7$ Pa (500 bars) into a distributor equipped with heated nozzles and gate pins. For example the PET polymer is heated at a temperature of 260° C. to 285° C., advantageously 270° C. to 285° C., for example approximately 280° C. The lowest possible temperature for this sub-step will be used to limit formation of acetaldehyde, in particular for reducing rate of acetaldehyde formation.

In one embodiment the sub-step of injecting comprises:
melting the PET polymer in a single or double-screw injection-moulding machine at a temperature of 270° C. to 285° C., preferably approximately 280° C.; and
feeding the melted PET polymer under pressure of $2.5 \cdot 10^7$ Pa to $5 \cdot 10^7$ Pa, into a mould at a temperature of 260° C. to 285° C.

The PET polymer is then typically injected from the distributor into at least one preform mould. The preform mould is eventually equipped with cooling means adapted to control the cooling rate thereof and thus further preventing spherulitic crystallization and yielding a preform, which does exhibit no crystallization visible as white areas or haze. The preform mould can be cooled to a temperature of 0° C. to 10° C. This cooling can be achieved by using any suitable coolant such as glycol water. Advantageously, the sub-step of injecting and the sub-step of cooling together last approximately 10 sec. to 20 sec.

After this cooling inside the mould, the preform is typically ejected and cooled at ambient temperature.

If no cooling is carried out inside the preform mould, the preform can be introduced directly into a blowing installation.

The preform thus obtained can be generally used in blowing methods for bottle production. These blowing methods are also known and described in numerous publications.

The blowing installation with or without stretching or drawing typically comprises heating means.

The preform is typically heated at least above the glass transition point (Tg) of the PET polymer. Advantageously, the heating temperature for the preform is 80° C. to 100° C. This heating is carried out using any suitable means, for example infrared rays directed toward the external surface of the preform.

The blowing step can comprise a pre-blowing step and a final blowing step. The preform can be pre-blown by injection of a gas, advantageously under a first pressure of $4\cdot10^5$ Pa to $10\cdot10^5$ Pa (4 bar to 10 bar) for a first period of 0.15 to 0.6 seconds.

The preform can be then finally blown by a second injection of a gas, advantageously under a second pressure of $3\cdot10^6$ Pa to $4\cdot10^6$ Pa (30 bar to 40 bar) for a second period of 0.3 sec. to 2 sec. giving the bottle its final shape prior to ejection thereof out of the blowing installation after cooling.

It is also known to introduce a drawing rod into the preform during the blowing step, for example during the pre-blowing and/or final blowing operations in order to partially draw the preform.

Recycling

The PET packaging element can also be recycled, recycling operations being known by the one skilled in the art.

In one embodiment the PET packaging element is mechanically recycled in the form of PET chips or granules. If the PET packaging element was bio-based, the PET chips or granules will typically comprise some bio-based material. Then these chips or granules can be re-used to produce PET packaging elements, notably with chips or granules of PET which has been synthesized. Such mixing operations are known by the one skilled in the art. One preferably uses grades of recycled materials, with appropriate purity and chemical features, that are adapted for further conversion into a PET packaging element. For example one can use a bottle grade recycled PET for making bottle. Preferably the amount of recycled PET in the mixture is of lower than or equal to 50 wt %, for example from 10 to 40 wt %.

In another embodiment the PET is chemically recycled to produce a stream of partially depolymerised PET, or 2 streams of monomers: one stream of diol comprising monoethylene glycol and one stream of diacid comprising a terephthalic compound. If the PET was made from biobased diol and/or diacid, the stream of partially depolymerised PET, or the stream(s) of diol and/or diacid can also be considered as bio-based. These streams can be re-used to prepare PET, typically by polymerization or further polymerization, and then PET packaging elements.

Thus the bio-based diacid and/or diol compounds can be obtained from chemical recycling of a bio-PET, such as a bio-based PET packaging element. One can typically use such material if a bio-PET was separated from conventional, typically oil-base PET, before recycling.

Use of 2,5-FDCA or an Ester Thereof

The present invention concerns also the use of a 2,5-FDCA compound selected from 2,5-furandicarboxylic acid (2,5-FDCA) and esters thereof as an anti-crystallization comonomer in a PET polymer, which can be a bio-based PET polymer.

The ester of 2,5-furandicarboxylic acid is as defined previously, i.e. a mono- or di-ester, and more particularly a diester, of 2,5-furandicarboxylic acid with a $(C_1-C_6)$alkanol, i.e. an alcohol of formula $R_1$—OH with $R_1$ representing a linear or branched saturated hydrocarbon chain comprising 1 to 6 carbon atoms ($(C_1-C_6)$alkyl), such as methyl. It will be more particularly dimethyl 2,5-furandicarboxylate.

The 2,5-FDCA compound is thus more particularly 2,5-furandicarboxylic acid or dimethyl 2,5-furandicarboxylate.

The diacid compounds used to prepare the PET polymer will comprise a terephthalic compound and a 2,5-FDCA compound. The terephthalic compound can be selected from terephthalic acid and an ester thereof, advantageously is selected from terephthalic acid and dimethyl terephthalate, and preferably is terephthalic acid. The 2,5-FDCA compound can be selected from 2,5-furandicarboxylic acid and an ester thereof, advantageously is selected from 2,5-furandicarboxylic acid and dimethyl 2,5-furandicarboxylate, preferably is 2,5-furandicarboxylic acid. Preferably, the diacid compounds comprise terephthalic acid and 2,5-furandicarboxylic acid.

In one embodiment, all or at least a part of the 2,5-FDCA compound is obtained from a bio-material. The bio-material, from which the 2,5-FDCA compound is obtained, comprises for example fructose, sucrose or a mixture thereof. A method for producing a 2,5-FDCA compound from bio-materials is detailed previously.

Bio-PET

The invention relates also to a fully bio-based PET polymer, i.e. a bio-based PET polymer comprising:
bio-based terephthalic units,
bio-based monoethylene glycol units, and
from 0.50 mol % to 7.50 mol %, advantageously from 2.25 mol % to 7.50 mol %, preferably from 2.50 mol % to 5.00 mol %, of anti-crystallization units based on the total amount of the diol units of the bio-based PET polymer if the anti-crystallization units correspond to diol units or based on the total amount of the diacid units of the bio-based PET polymer if the anti-crystallization units correspond to diacid units,
wherein the anti-crystallization units are derived from bio-based anti-crystallization comonomers.

The bio-based anti-crystallization units are derived from bio-based anti-crystallization comonomers which typically avoid spherulitic crystallization and allow a formation of very small crystals such that the produced bio-PET polymer is suitable for manufacturing a packaging element, such as a bio-PET bottle, with acceptable mechanical properties and/or processing parameters.

The bio-based anti-crystallization units can be diacid units (derived for example from 2,5-FDCA or an ester thereof) and/or a diol units (derived for example from 1,3-propanediol (PDO) or 1,4-butanediol (BDO)).

Thus the bio-based anti-crystallization units can be derived from anti-crystallization comonomers selected from PDO, BDO, 2,5-FDCA, esters of 2,5-FDCA and mixtures thereof, which are bio-based; notably from bio-based 2,5-FDCA or an ester thereof such as dimethyl 2,5-furandicarboxylate.

Advantageously, the bio-based anti-crystallization units can be derived from anti-crystallization comonomers selected from PDO, BDO, 2,5-FDCA and mixtures thereof, which are bio-based; notably from bio-based 2,5-FDCA.

Bio-based 2,5-FDCA or an ester thereof can be prepared as disclosed previously.

The bio-based PET polymer can also comprise bio-based diethylene glycol units derived from bio-based monoethylene glycol. Indeed, as indicated previously, diethylene glycol units (—O—CH$_2$CH$_2$—O—CH$_2$CH$_2$—O—) are often inherently present in PET since they are formed during synthesis by condensation of two molecules of monoethylene glycol.

Advantageously, the diol units of the bio-based PET polymer comprise less than 5.00 mol %, preferably less than 4.00 mol %, of diethylene glycol units.

Further details or advantages of the invention might appear in the following non limitative examples.

EXAMPLES

1. Synthesis of PET Polymers

Various PET polymers, with or without various anti-crystallization comonomers, were synthesized from monomer repartition reported in Table 1 below.

TABLE 1

Monomer repartition for the synthesis of PET polymers with or without various anti-crystallization comonomers

| PET polymer | Monomers | Mole fraction (/Σ diacids or diols) | wt % introduced in the reactor |
|---|---|---|---|
| PET | TA | 1.000 | 69.1 |
|  | MEG | 1.000 | 30.9 |
| PET-AIP | TA | 0.977 | 67.5 |
|  | AIP | 0.023 | 1.6 |
|  | MEG | 1.000 | 30.9 |
| PET-PDO-1 | TA | 1.000 | 68.95 |
|  | PDO | 0.020 | 0.75 |
|  | MEG | 0.980 | 30.3 |
| PET-PDO-2 | TA | 1.000 | 68.9 |
|  | PDO | 0.035 | 1.3 |
|  | MEG | 0.965 | 29.8 |
| PET-PDO-3 | TA | 1.000 | 68.7 |
|  | PDO | 0.060 | 2.3 |
|  | MEG | 0.940 | 29.0 |
| PET-FDCA-1 | TA | 0.980 | 67.7 |
|  | FDCA | 0.020 | 1.3 |
|  | MEG | 1.000 | 31.0 |
| PET-FDCA-2 (invention) | TA | 0.970 | 67.1 |
|  | FDCA | 0.030 | 1.9 |
|  | MEG | 1.000 | 31.0 |
| PET-FDCA-3 (invention) | TA | 0.960 | 66.4 |
|  | FDCA | 0.040 | 2.6 |
|  | MEG | 1.000 | 31.0 |
| PET-BDO-1 | TA | 1.000 | 68.75 |
|  | BDO | 0.030 | 1.35 |
|  | MEG | 0.970 | 29.9 |
| PET-BDO-2 | TA | 1.000 | 68.6 |
|  | BDO | 0.050 | 2.2 |
|  | MEG | 0.950 | 29.2 |
| PET-AA-1 | TA | 0.970 | 67.15 |
|  | AA | 0.030 | 1.85 |
|  | MEG | 1.000 | 31.0 |
| PET-AA-2 | TA | 0.950 | 65.9 |
|  | AA | 0.050 | 3.0 |
|  | MEG | 1.000 | 31.1 |

AA = adipic acid*;
AIP = isophthalic acid (prior art);
BDO = 1,4-butanediol*;
FDCA = 2,5furandicarboxylic acid*;
MEG = monoethylene glycol;
PDO = 1,3-propanediol*;
TA = terephthalic acid.
*anti-crystallization comonomers which can be bio-sourced These PET polymers were synthesized in a closed stainless steel reactor of 7.5 L in which 2.5-3 kg of PET polymer can be produced by batch. This reactor was equipped with a helical stirrer and a distillation column surmounted with a condenser. The PET polymers were synthesized according to a similar method as the one described below for PET-FDCA-3.

PET-FDCA-3 was synthesized in the reactor mentioned above as indicated below.

The reagents were loaded at ambient temperature. 2549.8 g (15.36 mol) of terephthalic acid (TA) and 99.9 g (0.64 mol) of 2,5-furandicarboxylic acid (FDCA) were added to 1190 g (19.2 mol) of monoethylene glycol (MEG). The mixture was stirred and heated from room temperature to 275° C. under pressure of nitrogen (6.6 bar-660kPa). At the end of the esterification, the catalyst (Sb$_2$O$_3$-250 ppm of Sb) was added in the reactor at atmospheric pressure. Then the pressure was decreased to 0.7 mbar (70 Pa) and the temperature was raised to 285° C. The PET polymer thus prepared was casted in a water bath and granulated to obtain PET pellets.

2. Analysis of PET Polymers: $^1$H NMR and Rate of Torque Increase

The PET polymers were analysed by $^1$H NMR on a Bruker 400 MHz NMR spectrometer equipped with 5 mm QNP probe in the mixture of solvents CDCl$_3$/trifluoroacetic acid-d 3/1 (v/v) with tetramethylsilane as internal reference. These $^1$H NMR analyses allow calculated the mol % of the various diacid and diol units in the PET polymers, and more particularly of the units derived from the anti-crystallization comonomer. The rate of torque increase at 0.7 mbar (70 Pa) and 285° C., indicating polymer chains growth, is also reported.

The results obtained are reported in Table 2 below.

TABLE 2

Compositions of the various PET polymers calculated by $^1$H NMR for the rate of polymerization obtained at 0.7 mbar (70 Pa) and 285° C.

| PET | Anti-crystallization comonomer | mol % anti-crystallization comonomer ($\Sigma$ diacids or diols) | Rate of polymerization torque increase in N · m/min | New PET name* |
|---|---|---|---|---|
| PET | — | — | — | PET |
| PET-AIP | AIP | 2.20 | 0.1950 | PET-AIP$_{2.20}$ |
| PET-PDO-1 | PDO | 2.01 | 0.1978 | PET-PDO$_{2.01}$ |
| PET-PDO-2 | | 3.44 | 0.1652 | PET-PDO$_{3.44}$ |
| PET-PDO-3 | | 5.93 | 0.1575 | PET-PDO$_{5.93}$ |
| PET-FDCA-1 | FDCA | 1.89 | 0.2401 | PET-FDCA$_{1.89}$ |
| PET-FDCA-2 (invention) | | 2.85 | 0.2629 | PET-FDCA$_{2.85}$ (invention) |
| PET-FDCA-3 (invention) | | 3.86 | 0.2679 | PET-FDCA$_{3.86}$ (invention) |
| PET-BDO-1 | BDO | 0.24 | 0.1900 | PET-BDO$_{0.24}$ |
| PET-BDO-2 | | 0.42 | 0.2016 | PET-BDO$_{0.42}$ |
| PET-AA-1 | AA | 2.86 | 0.2093 | PET-AA$_{2.86}$ |
| PET-AA-2 | | 4.83 | 0.2273 | PET-AA$_{4.83}$ |

*for PET polymers synthesized as described in point 1, with a polycondensation step stopped when a torque variation of 15N · m was reached 3. Viscosity in Solution The viscosity in solution (reduced viscosity and intrinsic viscosity) of the PET polymers was measured with an automated Ubbelohde capillary viscometer according to standard ISO1628-5:1998, in solution at 5 g/L in phenol-ortho-dichlorobenzene 50/50 (w/w) as solvent, at 25° C. The results obtained are presented in Table 3 below.

TABLE 3

Reduced and intrinsic viscosities of the PET polymers

| PET | Anti-crystallization comonomer | Reduced viscosity (mL/g) | Intrinsic viscosity [$\eta$] (dL/g)* |
|---|---|---|---|
| PET | — | 76.6 | 0.680 |
| PET-AIP$_{2.20}$ | AIP | 76.6 | 0.686 |
| PET-PDO$_{2.01}$ | PDO | 75.6 | 0.678 |
| PET-PDO$_{3.44}$ | | 74.4 | 0.668 |
| PET-PDO$_{5.93}$ | | 75 | 0.673 |
| PET-FDCA$_{1.89}$ | FDCA | 75.5 | 0.677 |
| PET-FDCA$_{2.85}$ (invention) | | 75.7 | 0.679 |
| PET-FDCA$_{3.86}$ (invention) | | 73.5 | 0.660 |
| PET-BDO$_{0.24}$ | BDO | 76.4 | 0.684 |
| PET-BDO$_{0.42}$ | | 75.6 | 0.678 |
| PET-AA$_{2.86}$ | AA | 78.8 | 0.703 |
| PET-AA$_{4.83}$ | | 81.3 | 0.724 |

*Calculated according to the following equation: $[\eta] = \sqrt{(2(\eta_{sp} - \ln\eta_{rel}))}/C$ with $\eta_{sp}$ = specific viscosity, $\eta_{rel}$ = relative viscosity, and C = concentration in g/dL.

The intrinsic viscosities are approximately of 0.680±0.020 dL/g for all the PET polymers, except for PET-AA$_{4.83}$. This suggests that the replacement of isophthalic acid as anti-crystallization comonomer with 1,3-propanediol, 1,4-butanediol or 2,5-furandicarboxylic acid, does not change the properties of the PET polymer.

4. Polycondensation Kinetics

The kinetics of the polycondensation step may be assessed by monitoring the evolution of the torque of the stirrer. Indeed, the molar mass of the PET polymer increases during the polycondensation reaction which leads to an increase in viscosity, which can be monitored by measuring the rate of torque increase (expressed in N·m/min) during the reaction in the molten medium.

These results, shown on table 2, demonstrate that an increase in the polycondensation rate is obtained only with FDCA as anti-crystallization comonomer in comparison to the case where AIP is used as anti-crystallization comonomer (prior art), in particular for initial amounts of 2,5-FDCA above 2.5 mol %, based on the total amount of diacid compounds. The PET polymer obtained comprises then at least 2.25 mol % of 2,5-FDCA units based on the total amount of diacid units.

5. Solid State Polymerization (SSP)

Some of the PET polymers synthesized as described in point 1 were further treated by a solid state polymerization (SSP) step.

The PET pellets were heated for 15 h at 200° C. under a stream of nitrogen.

The evolution of the reduced and intrinsic viscosities, before and after the SSP step, is reported in Table 4 below.

TABLE 4

Evolution of the reduced and intrinsic viscosities, before and after the SSP step, for PET-AIP$_{2.20}$ and PET-FDCA$_{3.86}$

| PET | Anti-crystallization comonomer | Reduced viscosity (mL/g) | Intrinsic viscosity [$\eta$] (dL/g) |
|---|---|---|---|
| PET-AIP$_{2.20}$ | AIP | 76.6 | 0.686 |
| PET-AIP$_{2.20}$ + SSP | | 94.0 | 0.823 |
| PET-FDCA$_{3.86}$ (invention) | FDCA | 73.5 | 0.660 |
| PET-FDCA$_{3.86}$ + SSP (invention) | | 94.8 | 0.830 |

This demonstrates that PET polymers comprising AIP units or 2,5-FCDA units derived from the anti-crystallization comonomer used have a similar behaviour after a solid state polymerization step. This shows that 2,5-furandicarboxylic acid (FDCA) represents an efficient alternative to isophthalic acid (AIP) as anti-crystallization comonomer.

The invention claimed is:
1. A method to prepare a PET polymer comprising:
diacid units derived from diacid compounds, said diacid units comprising:
 a) from 96.14 mol % to 97.15 mol % of said diacid units being terephthalic acid (TA) units or an ester thereof, and
 b) from 2.85 mol % to 3.86 mol % of said diacid units being 2,5-furandicarboxylic acid (2,5-FDCA) units or an ester thereof, based on 100 mol % of all diacid units, and
diol units derived from diol compound(s), said diol units comprising monoethylene glycol units in an amount of at least 95.00 mol % of the diol units and optionally diethylene glycol units in an amount of less than 5.00 mol % of the diol units, based on 100 mol % of all diol units, comprising copolymerizing a mixture of:
 the diacid compounds comprising terephthalic acid (TA) or an ester thereof, and 2,5-furandicarboxylic acid (2,5-FDCA) or an ester thereof, and the diol compound(s), wherein the diol compound(s) comprise at least 95.00 mol % of monoethylene glycol of said diol compound(s) based on 100 mol % of all diol compound(s), wherein copolymerizing comprises a first step of melt polymerization and a second step of solid state polymerization, wherein the melt polymerization comprises a first sub-step of esterification or transesterification and a second sub-step of polycondensation, wherein the polycondensation is performed at a temperature of 285° C. in the presence of $Sb_2O_3$ as a catalyst.

2. The method according to claim 1, wherein the diol units comprise diethylene glycol units in an amount of less than 5.00 mol % of the diol units.

3. The method according to claim 1, wherein at least one of the diacid and diol compounds is obtained from at least one bio-material.

4. The method according to claim 1, wherein:
the diacid compounds comprise:
   a) from 96.14 mol % to 97.00 mol % of said diacid compounds being terephthalic acid or dimethyl therephthalate, and
   b) from 3.00 mol % to 3.86 mol % of said diacid compounds being 2,5-furandicarboxylic acid or dimethyl 2,5-furandicarboxylate.

* * * * *